May 16, 1939. M. P. LAURENT 2,158,131
SWIVEL PIPE COUPLING
Filed April 30, 1937 2 Sheets—Sheet 1
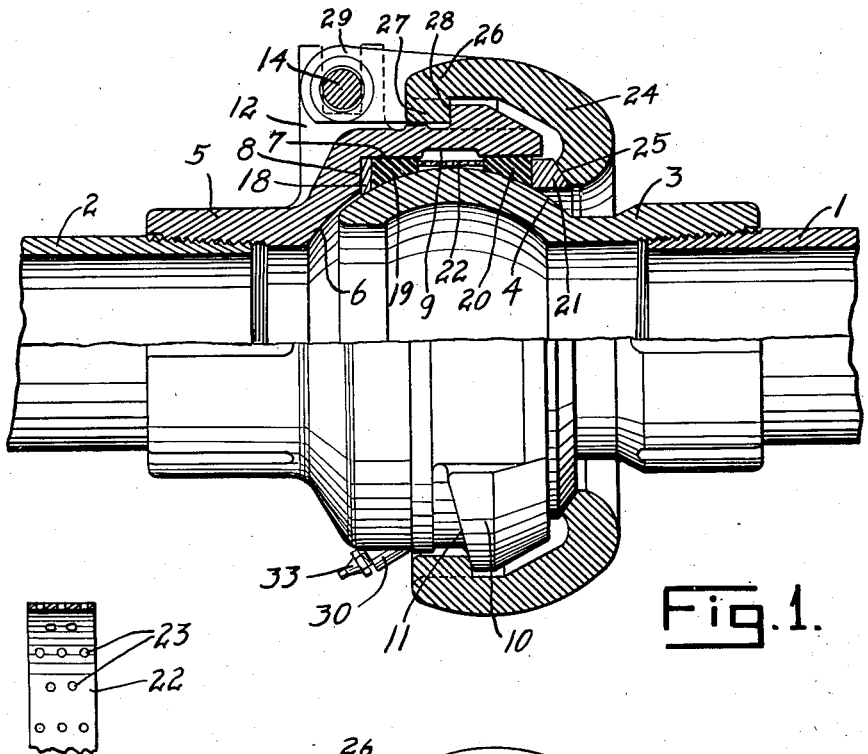
Fig.1.
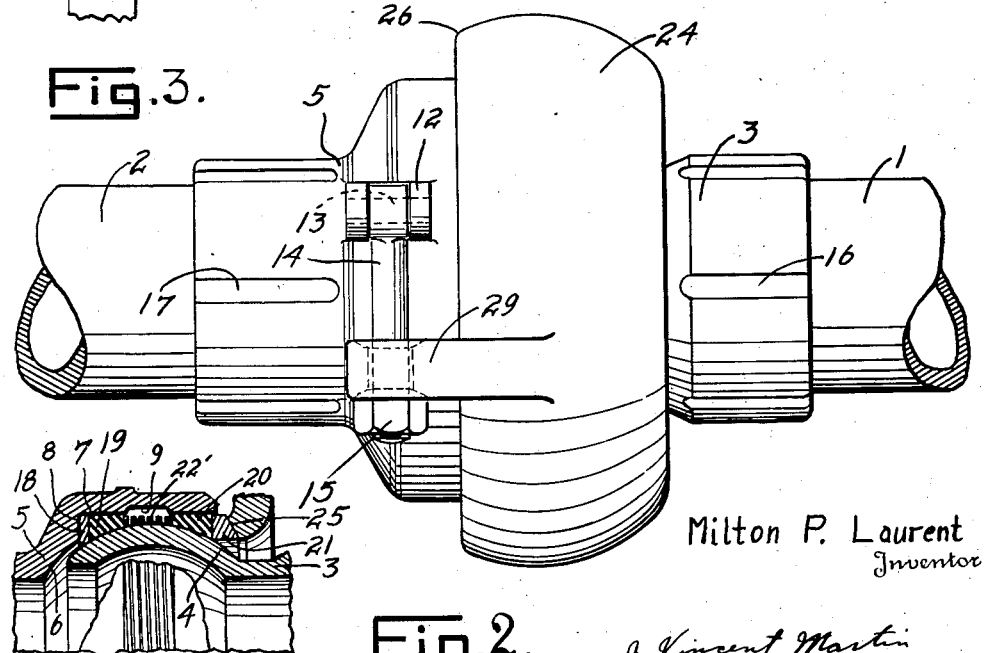
Fig.3.
Fig.2.
Fig.7.
Milton P. Laurent
Inventor
By J. Vincent Martin and Ralph R. Browning
Attorneys May 16, 1939.　　　M. P. LAURENT　　　2,158,131

SWIVEL PIPE COUPLING

Filed April 30, 1937　　　2 Sheets-Sheet 2

Milton P. Laurent.
Inventor

Patented May 16, 1939

2,158,131

UNITED STATES PATENT OFFICE 2,158,131

SWIVEL PIPE COUPLING

Milton P. Laurent, Houston, Tex.

Application April 30, 1937, Serial No. 139,856

7 Claims. (Cl. 285—91)

This invention relates to a pipe coupling. The specific embodiment of this invention as illustrated in this application relates to a flexible pipe coupling whereby two sections of pipe may be coupled together in such a manner that they may be moved pivotally with respect to each other without leakage through the joint.

Various types of swivel couplings have been developed in the past, but great difficulty has at all times been experienced in providing a swivel type coupling member or in fact any type coupling member having relatively movable parts, which coupling member would form a satisfactory seal between the relatively movable parts.

It is an object of this invention to provide a coupling member for two sections of pipe wherein a satisfactory seal between the parts may be produced, and wherein the relative movement of the parts will not only not impair the seal, but such relative movement of the parts will actually be facilitated by the arrangement of the various parts. Specifically, it is an object of this invention to provide a flexible or swivel joint with suitable sealing device which will prevent leakage from the joints, and which will facilitate relative movement of the parts.

It is a further object of this invention to provide a fluid sealed joint.

It is a further object of this invention to provide a joint of the type set forth with fluid actuated sealing means.

A further object of this invention is to provide a joint of the type set forth with sealing means adjustable for various working pressures.

Another object of this invention is to provide a joint of the ball and socket type having sealing rings for forming a seal between the ball and socket members wherein pressure against such sealing rings will force the same into tighter engagement with the surface of the ball member.

It is a further specific object to provide such a joint with means for preventing damage to the packing thereof in the event that the joint is not properly cared for.

It is a further object to provide a fluid sealed joint which will not be entirely dependent upon the fluid seal for its sealing action.

Other objects and advantages of this invention will become apparent from the following description taken in connection with the accompanying drawings, it being understood that the disclosure therein is by way of example and illustration only and not by way of limitation. This invention is to be limited only by the prior art and by the terms of the appended claims.

Referring now to the drawings in which like numerals indicate corresponding parts throughout:

Fig. 1 is a side view with parts being broken away and shown in section illustrating one embodiment of this invention.

Fig. 2 is a top plan view of the joint shown in Fig. 1.

Fig. 3 is a segmental view of the spacer element forming a part of the joint shown in Fig. 1.

Fig. 7 is a fragmentary sectional view similar to the upper portion of Fig. 1, illustrating a modified form of spacing element for the packing rings.

Figure 4:
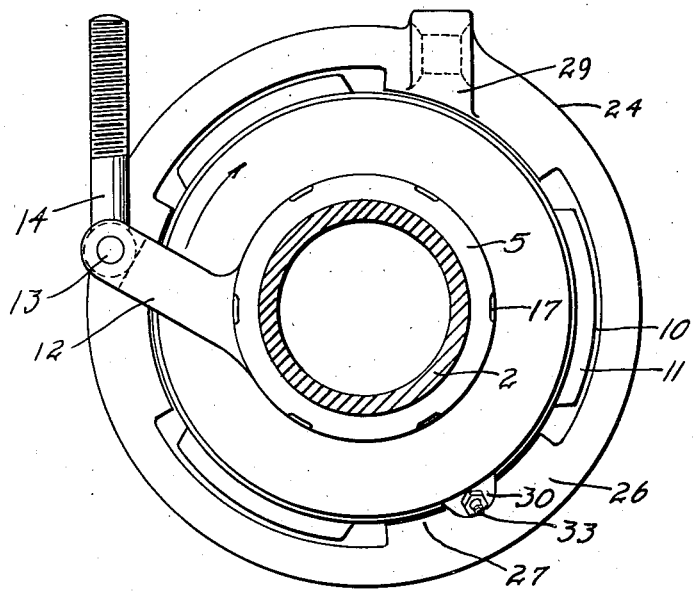
Fig. 4 is an end view of the joint shown in Fig. 1 looking from the left end thereof and showing the parts of the joint as they are being coupled together.
Figure 5:
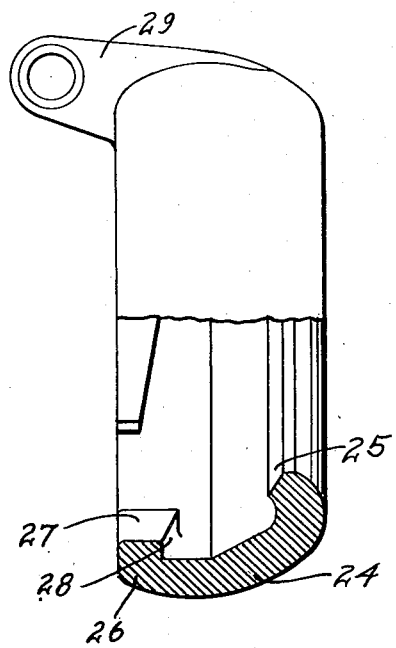
Fig. 5 is a view partly in section and partly in elevation showing the clamping ring or nut forming a part of this joint.
Figure 6:
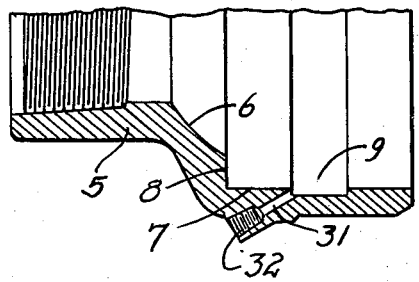
Fig. 6 is a partially sectional view of the lower portion of the socket member forming a part of the joint shown in Fig. 1.

Referring now to Figs. 1 and 2, it will be seen that the joint illustrated is being utilized to join together two sections of pipe illustrated by the numerals 1 and 2, respectively. Threadedly connected to the end of the section of pipe 1 is the ball member 3 formed with the substantially spherical or ball shaped part 4. Similarly joined to the other section of pipe 2 is a socket member 5 having a portion 6 adjacent the end of the pipe 2 which is of substantially spherical contour so as to accommodate the spherical part 4 of the ball member 3. This socket member embraces a ball member 3. This socket member embraces a portion 7 of enlarged internal diameter joined to the portion 6 by a shoulder 8. The portion 7 is divided into two cylindrical parts by means of an annular channel 9, the purpose of which will presently be set forth.

On the exterior of the socket member there are formed a plurality of lugs 10, each lug having a cam or inclined face 11. Also on the exterior of the socket member upon one side thereof is formed a laterally extending lug 12 bifurcated at its outer end to receive a pivot pin 13 by means of which a bolt 14 is mounted therein. A nut 15 is provided for the free end of this bolt which is employed to tighten the parts of the joint together and to secure them in that position.

For the purpose of facilitating the attachment and removal of the ball and socket members of this joint, it is contemplated that two portions which are threadedly engaged with the pipe sections 1 and 2 may be formed with grooves 16 and 17 or similar uneven formations.

Within the interior of the socket member before it is placed upon the ball section of the joint, there is inserted and seated against the shoulder 8 a bearing ring 18 which is adapted to receive and form an abutment for a packing ring 19 of somewhat trapezoidal cross-section. The ball member 3 is then inserted into the socket and the packing ring 20 which is similar to the packing ring 19 is placed within the socket in the opposite side of the ball member in opposing relation to the ring 19. A single bearing ring or thrust ring 21 is positioned against the outside end of the packing ring 20 and a suitable spacer member or ring 22 is interposed between the two packing rings. This spacing ring 22 is preferably of the form illustrated in Fig. 3, and is provided with openings 23 therethrough so that it in effect forms simply a skeleton spacer.

For the purpose of holding the thrust ring 21 in position against the packing ring 20 there is provided a locking ring 24 having an inturned abutting edge 25 bearing against the outer surface of the ring 21. It is to be noted that this abutting edge, together with the cooperating surface of the ring 21, is not a radial surface but is disposed in such a manner that the parts will most firmly seat against each other.

This ring 24 fits over the end portion of the socket member 5 as shown at 26, and has inwardly directed lugs 27 with inclined faces 28 adapted to cooperate with the lugs 10 and the inclined faces 11 thereon so that when the ring 24 is rotated with respect to the socket the lugs 27 will ride up on the lugs 10 and will force the thrust ring 21 toward the interior of the socket. Through the medium of the spacing ring 22 this will cause an initial compression of both of the packing rings 19 and 20 so that they will form an initial seal with the adjacent surface of the ball and socket members, respectively. This compression, due to the inclination of the inner walls of the rings 18 and 21 with respect to radial lines, causes the packing rings to be wedged radially inwardly against the ball to form a more perfect seal. It is to be noted at this point, however, that the rings 18 and 21 will come into contact with the surface 4 of the ball member before the packing rings 19 and 20 have been unduly compressed, and thus prevent any further compression of or damage to these rings by action of the nut 24. Rings 18 and 21 are of a soft yet strong metal which will form a positive bearing surface against the surface 4 but will not scratch or mar said surface or cause it to subsequently damage the packing rings 19 and 20.

The ring or nut 24 is also provided with a lug 29 having an opening therein adapted to receive the bolt 14 in the manner illustrated in Fig. 2. When the ring has been placed in position and rotated so as to hold the ball and socket members together, the nut 15 upon the bolt 14 may be tightened so as to make this connection firm and tight, and prevent reverse rotation of the ring 24. At the lower side of the socket member as illustrated in Figs. 1 and 4 there is formed a boss 30 drilled out to provide a bore 31 communicating with the channel 9 inside the socket member. The outer end of the bore 31 is threaded as shown at 32 to receive a grease fitting 33 so that grease under pressure may be forced into the channel 9 and the space between the packing rings.

In actual practice, the joint will first be assembled as just described, and then grease under heavy pressure will be forced into the space between the packing rings 19 and 20, thus still further compressing these rings and causing them to form a firmer seal against the adjacent surface of the ball and socket members. That is, the grease will penetrate the space between the packing rings and possibly the packing rings themselves and will compensate for an unevenness in the surface of the ball or the packing rings. At the same time, however, this lubricant between the two packing rings will serve to lubricate the surface between the packing rings and the ball member designated at 4 so that the section of pipe 1 to which the ball member is connected may be moved the more freely with respect to the section 2 which carries the socket member. This means not only that the two sections of pipe may be moved with respect to each other, relatively freely and without substantial damage to the packing rings, but it also means that there is at all times within the joint member a quantity of grease under pressure which serves to firmly seal both of the packing rings against the adjacent surface of both of the joint members. This positively prevents the objectionable leakage which this invention is designed to overcome. If, however, through neglect or ignorance of some person having charge of the maintenance of such joints, or for any other reason the lubricant within the space between the sealing rings becomes depleted, the sealing rings will not be unduly damaged because of the fact that the spacer 22 is positioned therebetween and prevents the adjacent ends of the sealing rings from movement toward each other, by any pressure which might exist either within or without the pipe. Likewise, any swinging movement of the ball member within these sealing rings will be prevented from actuating the sealing rings toward the center of the space within which they are mounted and causing them to be permanently distorted and damaged beyond use. On the other hand, the packing rings cannot be injured by mechanical tightening of the joint because before the packing rings can be forced tight enough to be damaged, the bearing rings will come into contact with the ball and prevent further compression of the packing rings.

In Fig. 7 there is shown a modified form of spacer for the packing rings in the form of a coil spring 22'. The end convolutions of this spring are so formed that they will have substantially flat annular bearing surfaces in contact with the packing rings. This spring is of such design that it is almost completely compressed when the joint is fully assembled so that there will at all times be a compressive force exerted on the packing rings even when no fluid is present. Yet because the spring is almost completely compressed, a relatively slight movement of either packing ring toward the other will completely compress the spring and it will thereafter positively prevent any further movement of the rings toward each other.

It is within the purview of this invention that the pressure of the grease within the annular chamber between the packing rings shall be slightly greater than the pressure within the pipe line so that any leakage which does take place past the packing ring 19 will take place in a direction toward the interior of the pipe line rather than away from such interior. This is not, however, a hard and fast rule, because under certain circumstances the influx of even a small amount of such grease might prove harmful to the contents of the pipe, and under these circumstances the pressure within the annular chamber would, of course, be regulated in accordance with the conditions prevailing.

It is further contemplated that the fluid injected into the joint might be of such a nature as to harden and form a substantially solid filler body between the packing rings and upon the adjacent surfaces of the packing rings and ball upon the application of heat.

By the foregoing, it will be seen that there has been set forth a device capable of carrying out all the objects and advantages sought by this invention. It is to be understood that various changes may be made within the spirit and scope of the appended claims.

I claim:

1. In a coupling for pipes, an internal ball member on one pipe and an external socket member on the other pipe and surrounding said ball member; a pair of rigid rings and a pair of distortable packing rings, all of an internal diameter less than the external diameter of said ball member, said packing rings being disposed between said rigid rings, and contacting said ball on opposite sides of a great circle, said rigid rings being softer than said ball member, and means to adjust said rigid rings toward each other and toward said ball member to compress said packing rings to seal said coupling and to move said rigid rings further toward each other and into contact with said ball for locking said coupling in adjusted position.

2. In a coupling for pipes, an internal ball member on one pipe and an external socket member on the other pipe and surrounding said ball member; a pair of rigid rings and a pair of distortable packing rings, all of an internal diameter less than the external diameter of said ball member, said packing rings being disposed between said rigid rings, and contacting said ball on opposite sides of a great circle, said rigid rings being softer than said ball member, and means to adjust said rigid rings toward each other and toward said ball member to compress said packing rings to seal said coupling and to move said rigid rings further toward each other and into contact with said ball for locking said coupling in adjusted position, and spacing means between said packing rings to limit the movement thereof toward each other.

3. In a coupling for pipes, an internal ball member on one pipe and an external socket member on the other pipe and surrounding said ball member; a pair of rigid rings and a pair of distortable packing rings, all of an internal diameter less than the external diameter of said ball member, said packing rings being disposed between said rigid rings, and contacting said ball on opposite sides of a great circle, said rigid rings being softer than said ball member, and means to adjust said rigid rings toward each other and toward said ball member to compress said packing rings to seal said coupling and to move said rigid rings further toward each other and into contact with said ball for locking said coupling in adjusted position, said ball member and socket member forming a lubricant chamber between said packing rings for maintaining lubricant under pressure.

4. In a coupling for pipes, an internal ball member on one pipe and an external socket member on the other pipe and surrounding said ball member; a pair of rigid rings and a pair of distortable packing rings, all of an internal diameter less than the external diameter of said ball member, said packing rings being disposed between said rigid rings, and contacting said ball on opposite sides of a great circle, said rigid rings being softer than said ball member, and means to adjust said rigid rings toward each other and toward said ball member to compress said packing rings to seal said coupling and to move said rigid rings further toward each other and into contact with said ball for locking said coupling in adjusted position, and spacing means between said packing rings to limit the movement thereof toward each other, said ball member and socket member forming a lubricant chamber between said packing rings for maintaining lubricant under pressure.

5. In a coupling for pipes, an internal ball member on one pipe and an external socket member on the other pipe and surrounding said ball member; a pair of rigid rings of an internal diameter less than the external diameter of said ball member, a pair of distortable packing rings on said ball member between said rigid rings and contacting said ball on opposite sides of a great circle, and means to adjust said rigid rings toward each other to first compress said packing rings and then into contact with said ball for locking said coupling in adjusted position.

6. In a coupling for pipes, an internal ball member on one pipe and an external socket member on the other pipe and surrounding said ball member; a pair of rigid rings of an internal diameter less than the external diameter of said ball member, and on opposite sides of a great circle, said rings being softer than said ball member, and means to adjust said rings toward each other and into contact with said ball for locking said coupling in adjusted position.

7. In a coupling for pipes, an internal ball member on one pipe and an external socket member on the other pipe and surrounding said ball member; sealing and locking means of internal diameters less than the external diameter of said ball member, and on opposite sides of a great circle, said means including an inner resilient and an outer relatively rigid element softer than said ball member, and actuating means to adjust said sealing and locking means toward each other and into contact with said ball member to seal and lock said ball member in said socket member in adjusted position.

MILTON P. LAURENT.